(12) United States Patent
Zhang et al.

(10) Patent No.: US 12,264,089 B1
(45) Date of Patent: Apr. 1, 2025

(54) METHOD FOR TREATING ELECTROPLATING WASTEWATER

(71) Applicant: Nanchang Hangkong University, Nanchang (CN)

(72) Inventors: Jun Zhang, Nanchang (CN); Huanhai Chen, Nanchang (CN); Fan Zhang, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 0 days.

(21) Appl. No.: 18/884,219

(22) Filed: Sep. 13, 2024

(51) Int. Cl.
| | |
|---|---|
| C02F 1/66 | (2023.01) |
| C02F 1/00 | (2023.01) |
| C02F 1/56 | (2023.01) |
| C02F 1/70 | (2023.01) |
| C02F 9/00 | (2023.01) |
| C02F 101/18 | (2006.01) |
| C02F 101/22 | (2006.01) |
| C02F 103/16 | (2006.01) |

(52) U.S. Cl.
CPC ............... *C02F 1/66* (2013.01); *C02F 1/001* (2013.01); *C02F 1/56* (2013.01); *C02F 1/705* (2013.01); *C02F 9/00* (2013.01); *C02F 2101/18* (2013.01); *C02F 2101/22* (2013.01); *C02F 2103/16* (2013.01); *C02F 2209/06* (2013.01)

(58) Field of Classification Search
None
See application file for complete search history.

(56) References Cited

U.S. PATENT DOCUMENTS

| | | | | |
|---|---|---|---|---|
| 5,106,508 A | * | 4/1992 | Schwitzgebel | C02F 1/70 210/720 |
| 2020/0048125 A1 | * | 2/2020 | Guo | C02F 9/00 |

FOREIGN PATENT DOCUMENTS

CN 106477807 A * 3/2017 ............ C02F 9/00

OTHER PUBLICATIONS

Machine translation of CN-106477807-A, pp. 1-6. (Year: 2017).*

* cited by examiner

Primary Examiner — Clare M Perrin
(74) Attorney, Agent, or Firm — Hemisphere Law, PLLC; Zhigang Ma (57) ABSTRACT

A method for treating electroplating wastewater includes: performing a cyanide primary treatment on to-be-treated cyanide containing wastewater in a treatment tank by using a chlor-alkali process; performing a cyanide secondary treatment on the wastewater after cyanide primary treatment by controlling an addictive amount of chromium containing wastewater and adding acid liquor for adjusting a pH value of the wastewater to a preset acidity range; performing a hexavalent chromium reduction treatment on the wastewater after the cyanide secondary treatment by adding acid liquor for adjusting a pH value of the wastewater to a preset acidity range and adding a sulfite solution; and performing neutralization flocculation, solid-liquid separation, and sand filtration on the wastewater after the hexavalent chromium reduction treatment sequentially to obtain dischargeable water meeting a preset standard. The method can effectively remove harmful substances such as cyanide, chromium, copper and zinc, to thereby reduce environmental pollution and save treatment costs.

9 Claims, 3 Drawing Sheets

METHOD FOR TREATING ELECTROPLATING WASTEWATER

TECHNICAL FIELD

The disclosure relates to the field of wastewater treatment technologies, and more particularly to a method for treating electroplating wastewater.

BACKGROUND

Electroplating is widely used in industrial production, but wastewater discharged by the electroplating contains a large amount of toxic and harmful substances. There are many types of the electroplating, such as: degreasing, acid washing, cyanide zinc plating, cyanide copper plating, cyanide copper zinc alloy plating, nickel plating, chromium plating, electropolishing, zinc coating passivation, copper and copper alloy dichromate passivation, and aluminum and aluminum alloy anodizing. Generally, the amount of chromium containing wastewater discharged from production is greater than that of cyanide containing wastewater, and a content of chromium in the chromium containing wastewater is relatively high. Specifically, the cyanide containing wastewater discharged during electroplating production is weakly alkaline, and the forms of cyanide present in the cyanide containing wastewater are free cyanide and metal complexes such as copper cyanide and zinc cyanide. The cyanide has reducibility, and when a power of hydrogen (pH) value of wastewater is above 11, the cyanide is basically in a stable state. As the pH value decreases, more toxic substance cyanide is released. The chromium containing wastewater is acidic and has a high content of hexavalent chromium with oxidizability. The cyanide containing wastewater and the chromium containing wastewater are highly toxic, and contain heavy metal ions such as zinc and copper, which are harmful to human health and the natural environment. Therefore, it is necessary to treat the wastewater to meet the standards. The cyanide containing wastewater and the chromium containing wastewater are commonly treated separately using chemical methods, which require large equipment investment and high dosing costs. Some treatment methods have low automation levels and are inconvenient to manage, resulting in high operating costs.

SUMMARY

The disclosure provides a method for treating electroplating wastewater, including:

adding to-be-treated cyanide containing wastewater into a treatment tank, and performing a cyanide primary treatment on the to-be-treated cyanide containing wastewater in the treatment tank to obtain wastewater after cyanide primary treatment (also referred to as primary treated wastewater); where a process of the cyanide primary treatment includes: under a stirring condition, adding alkali liquor into the to-be-treated cyanide containing wastewater to adjust a pH value of the to-be-treated cyanide containing wastewater to a first preset alkaline range, and adding a sodium hypochlorite solution into the to-be-treated cyanide containing wastewater simultaneously to adjust an oxidation-reduction potential (ORP) of the to-be-treated cyanide containing wastewater to obtain a first mixture; and allowing the first mixture to react at room temperature for a period of time, and retain (also referred to as hold) for a period of time, to thereby obtain the wastewater after cyanide primary treatment; and chlorine is remained in the wastewater after cyanide primary treatment;

performing a cyanide secondary treatment on the wastewater after cyanide primary treatment to obtain wastewater after cyanide secondary treatment (also referred to as secondary treated wastewater); where a process of the cyanide secondary treatment includes: adding chromium containing wastewater into the primary treated wastewater, controlling an additive amount of the chromium containing wastewater, and adding acid liquor into the wastewater after cyanide primary treatment simultaneously to adjust a pH value of the wastewater after cyanide primary treatment to a first preset acidity range ensure a redox condition in the treatment tank suitable for performing the cyanide secondary treatment and obtain a second mixture, and allowing the second mixture to react at room temperature for a period of time, and retain for a period of time, to thereby obtain the wastewater after cyanide secondary treatment; and chromium is remained in the wastewater after cyanide secondary treatment;

performing a hexavalent chromium reduction treatment on the wastewater after cyanide secondary treatment to obtain wastewater after hexavalent chromium reduction treatment (also referred to as reduction treated wastewater); wherein a process of the hexavalent chromium reduction treatment comprises: under a stirring condition, adding acid liquor into the wastewater after cyanide secondary treatment to adjust a pH value of the wastewater after cyanide secondary treatment to a second preset acidity range, and adding a sulfite solution into the wastewater after cyanide secondary treatment simultaneously to adjust an ORP of the wastewater after cyanide secondary treatment to be suitable for performing a hexavalent chromium reduction treatment, to thereby obtain a third mixture; and allowing the third mixture to react at room temperature for a period of time to reduce hexavalent chromium to trivalent chromium, and retain for a period of time, to thereby obtain the wastewater after hexavalent chromium reduction treatment; and sulfite is remained in the wastewater after hexavalent chromium reduction treatment; and performing neutralization flocculation, solid-liquid separation, and sand filtration on the wastewater after hexavalent chromium reduction treatment sequentially to obtain dischargeable water meeting a preset standard.

In an embodiment of the above method for treating electroplating wastewater, in the process of the cyanide primary treatment: the alkali liquor is added based on a pH control system, the sodium hypochlorite solution is added based on an ORP control system, and the pH control system and the ORP control system are linked to control the pH value and the ORP of the to-be-treated cyanide containing wastewater.

In an embodiment of the above method for treating electroplating wastewater, in the process of the cyanide primary treatment, the first preset alkaline range is 10-11, the ORP of the to-be-treated cyanide containing wastewater is adjusted to a range of 300 millivolts (mV) to 350 mV, the room temperature is in a range of 10 Celsius degree (° C.) to 40° C., a reaction period of the first mixture (also referred to as the period of time of the first mixture to react) is in a range of 20 minutes (min) to 25 min, and a retention period of the first mixture (also referred to as the period of time of the first mixture to retain) is in a range of 10 min to 15 min.

In an embodiment of the above method for treating electroplating wastewater, the controlling an additive amount of the chromium containing wastewater, and adding acid liquor into the wastewater after cyanide primary treatment simultaneously to adjust a pH value of the wastewater after cyanide primary treatment to a first preset acidity range ensure a redox condition in the treatment tank suitable for performing the cyanide secondary treatment and obtain a second mixture, includes:

controlling the addictive amount of the chromium containing wastewater added into the wastewater after cyanide primary treatment based on the ORP control system, and adding the acid liquor into the wastewater after cyanide primary treatment simultaneously based on the pH control system; where the ORP control system and the pH control system are linked to control an ORP and the pH value of the wastewater after cyanide primary treatment.

In an embodiment of the above method for treating electroplating wastewater, an addition method of the chromium containing wastewater into the primary treated wastewater includes:

adding a part of the chromium containing wastewater into a cyanide secondary treatment tank by the ORP control system, and adding remaining chromium containing wastewater into a hexavalent chromium reduction treatment tank at a first preset flow rate to be merged with the wastewater after cyanide secondary treatment, to thereby perform the hexavalent chromium reduction treatment; or adding all of the chromium containing wastewater into the cyanide secondary treatment tank at a second preset flow rate by the ORP control system for the cyanide secondary treatment, and performing the hexavalent chromium reduction treatment after the cyanide secondary treatment.

The preset flow rate is set according to a wastewater treatment ability of a treatment device using a chromium containing wastewater inlet flowmeter.

In an embodiment of the above method for treating electroplating wastewater, in the process of the cyanide secondary treatment, the first preset acidity range is 2-3, an ORP of the wastewater after cyanide primary treatment is adjusted to a range of 550 mV to 600 mV, the room temperature is in a range of 10° C. to 40° C., a reaction period of the second mixture (also referred to as the period of time of the second mixture to react) is in a range of 15 min to 20 min, and a retention period of the second mixture (also referred to as the period of time of the second mixture to retain) is in a range of 5 min to 8 min. In a process of the hexavalent chromium reduction treatment, the second preset acidity range is 2-3, the ORP of the wastewater after cyanide secondary treatment is adjusted to a range of 220 mV to 260 mV, the room temperature is in a range of 10° C. to 40° C., a reaction period of the third mixture (also referred to as the period of time of the third mixture to react) is in a range of 20 min to 25 min, and a retention period of the third mixture (also referred to as the period of time of the third mixture to retain) is in a range of 10 min to 15 min.

In an embodiment of the above method for treating electroplating wastewater, the chlorine remained in the wastewater after cyanide primary treatment is quantified as chloride ($Cl^-$) with a concentration range of 3 milligrams per liter (mg/L) to 5 mg/L. The chromium remained in the wastewater after cyanide secondary treatment is quantified as hexavalent chromium ($Cr^{6+}$) with a concentration not less than 4 mg/L. The sulfite remained in the wastewater after hexavalent chromium reduction treatment is quantified as sulfite ($SO_3^{2-}$) with a concentration range of 3 mg/L to 4 mg/L.

In an embodiment of the above method for treating electroplating wastewater, the neutralization flocculation includes: adding alkali liquor into the wastewater after hexavalent chromium reduction treatment by a pH control system to adjust a pH value of the wastewater after hexavalent chromium reduction treatment to a second preset alkaline range, and adding an aluminum salt solution and a polyacrylamide solution into the wastewater after hexavalent chromium reduction treatment simultaneously to coagulate for a period of time, to thereby form metal hydroxide flocculent precipitation, and retaining the metal hydroxide flocculent precipitation for a period of time to obtain wastewater after neutralization flocculation (also referred to as neutralization flocculated wastewater).

In an embodiment of the above method for treating electroplating wastewater, in a process of the neutralization flocculation, the second preset alkaline the pH value is 8-9, the aluminum salt solution is a polyaluminum chloride aqueous solution with a concentration of 4-5%, an addictive amount of the aluminum salt solution in the wastewater after hexavalent chromium reduction treatment is in a range of 6 liters per cubic meter ($L/m^3$) to 8 $L/m^3$, the polyacrylamide solution is an aqueous solution with a concentration of 0.1% to 0.2%, an addictive amount of the polyacrylamide solution in the wastewater after hexavalent chromium reduction treatment is in a range of 6 $L/m^3$ to 7 $L/m^3$, a coagulation period is in a range of 10 min to 15 min, and a retention period of the metal hydroxide flocculent precipitation is in a range of 8 min to 10 min.

In an embodiment of the above method for treating electroplating wastewater, the solid-liquid separation includes: performing the solid-liquid separation on the wastewater after neutralization flocculation to obtain a solid phase and a liquid phase; where the solid phase is deposited at bottom, and periodically taken out for dehydration and drying.

The sand filtration includes: performing the sand filtration on the liquid phase; where a device for the sand filtration is a sand filtration pool or a sand filtration tank.

In the embodiments of the disclosure, the disclosure provides a method for treating electroplating wastewater, including: adding the to-be-treated cyanide containing wastewater into the treatment tank, and performing the cyanide primary treatment on the to-be-treated cyanide containing wastewater in the treatment tank to obtain the wastewater after cyanide primary treatment; where the process of the cyanide primary treatment includes: under the stirring condition, adding the alkali liquor into the to-be-treated cyanide containing wastewater to adjust the pH value of the to-be-treated cyanide containing wastewater to the first preset alkaline range, and adding the sodium hypochlorite solution into the to-be-treated cyanide containing wastewater simultaneously to adjust the ORP of the to-be-treated cyanide containing wastewater to a preset range to obtain the first mixture, and allowing the first mixture to react at the room temperature for a period of time; and chlorine with a concentration of 3 mg/L to 5 mg/L is remained in the wastewater after cyanide primary treatment; performing the cyanide secondary treatment on the wastewater after cyanide primary treatment to obtain the wastewater after cyanide secondary treatment; where the process of the cyanide secondary treatment includes: controlling the additive amount of the chromium containing wastewater to adjust the ORP of the wastewater after cyanide primary treatment to a preset range, adding the acid liquor into the wastewater after cyanide primary treatment simultaneously to adjust the pH value of the wastewater after cyanide primary treatment to the first preset acidity range to obtain the second mixture, to thereby ensure the redox condition in the treatment tank suitable for performing the cyanide secondary treatment, and allowing the second mixture to react at the room temperature for a period of time, and retain for a period of time, to thereby obtain the wastewater after cyanide secondary treatment; and chromium is remained in the wastewater after cyanide secondary treatment; under a stirring condition, adding the acid liquor into the wastewater after cyanide secondary treatment to adjust the pH value of the wastewater after cyanide secondary treatment to the second preset acidity range, and adding the sulfite solution into the wastewater after cyanide secondary treatment simultaneously to adjust the ORP of the wastewater after cyanide secondary treatment to a preset range to thereby obtain the third mixture, and allowing the third mixture to react at the room temperature for a period of time to reduce hexavalent chromium to trivalent chromium, and retain for a period of time, to thereby obtain the wastewater after hexavalent chromium reduction treatment; and the sulfite is remained in the wastewater after hexavalent chromium reduction treatment; performing neutralization flocculation, solid-liquid separation, and sand filtration on the wastewater after hexavalent chromium reduction treatment sequentially to obtain dischargeable water meeting the preset standard.

Compared to the related art, beneficial effects of the method for treating electroplating wastewater provided by the disclosure are as follows.

Firstly, in the cyanide primary treatment, the alkali liquor and the sodium hypochlorite solution are added into the to-be-treated cyanide containing wastewater, which can effectively adjust the pH value and the ORP of the to-be-treated cyanide containing wastewater, to thereby promote oxidation of free cyanide, copper cyanide complexes, zinc cyanide complexes and other cyanides in the to-be-treated cyanide containing wastewater, and a proper amount of chlorine is remained to ensure the oxidation reaction effect. Secondly, in the cyanide secondary treatment, the addictive amount of the chromium containing wastewater is controlled, the acid liquor is added, oxidizability of the hexavalent chromium is used, and the cyanide secondary treatment is combined with the hexavalent chromium reduction treatment to oxidize cyanate radical ($CNO^-$) generated by the cyanide primary treatment to carbon dioxide ($CO_2$) and nitrogen ($N_2$), and reduce dichromate ion ($Cr_2O_7^{2-}$) to trivalent chromium ($Cr^{3+}$), so as to treat waste with waste. When performing the cyanide secondary treatment, other oxidants do not to be used to oxidize the cyanate radical, and an amount of reducing agent required for the next step of the hexavalent chromium reduction treatment is reduced. The pH value required in the hexavalent chromium reduction treatment is acidic, to thereby save the amount of the acid liquor used, and further reduce costs for treating the electroplating wastewater.

Furthermore, the cyanide containing wastewater and the chromium containing wastewater are treated with each other, with less equipment investment, less dosage of wastewater treatment chemicals, higher degree of equipment automation, convenient management and stable operation. After wastewater treatment, the residual amount of pollutants in the water is low and the environmental friendliness is enhanced.

BRIEF DESCRIPTION OF DRAWINGS

Referring to drawings, disclosed content of the disclosure will become easier to understand. It is easy for those skilled in the art to understand that these drawings are merely for illustrative purposes and do not constitute limitations on a scope of protection of the disclosure. In addition, similar numbers and symbols in the drawings are used to represent similar components.

DETAILED DESCRIPTION OF EMBODIMENTS

Some of embodiments of the disclosure are described below with reference to drawings. It should be understood by those skilled in the art that these embodiments are merely used to describe technical principles of the disclosure, and are not intended to limit a scope of protection of the disclosure.

Embodiment 1

Figure 1:
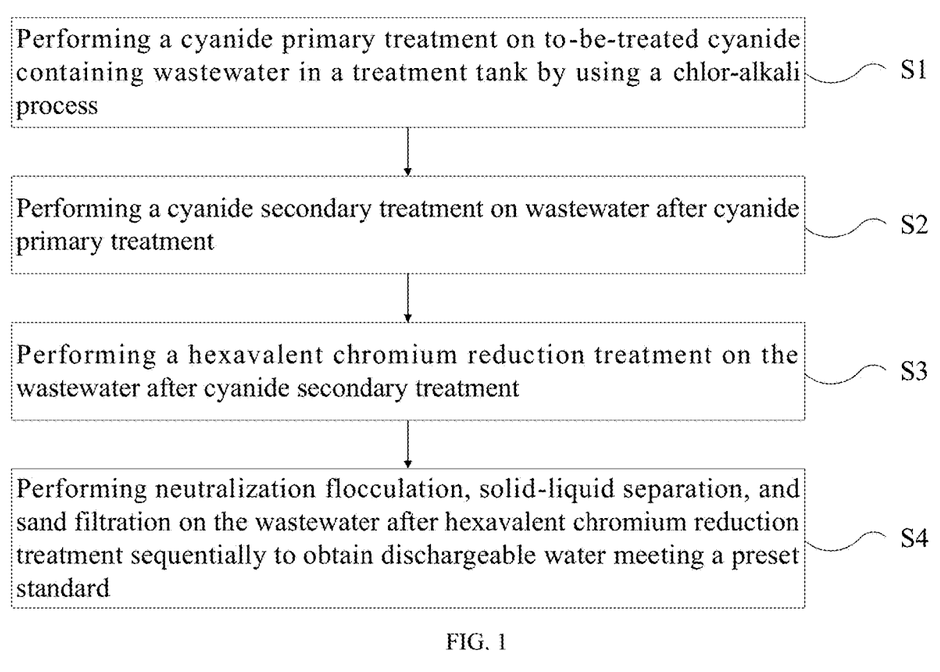
FIG. 1 illustrates a flowchart of a method for treating electroplating wastewater according to an embodiment of the disclosure.

Referring to FIG. 1, FIG. 1 illustrates a flowchart of a method for treating electroplating wastewater according to an embodiment of the disclosure. As shown in FIG. 1, the method for treating electroplating wastewater in the embodiment of the disclosure includes the following steps S1-S4.

The disclosure provides a method for treating electroplating wastewater, including the following steps S1-S4.

In step S1, to-be-treated cyanide containing wastewater is added into a treatment tank, and a cyanide primary treatment is performed on the to-be-treated cyanide containing wastewater in the treatment tank to obtain wastewater after cyanide primary treatment. In a process of the cyanide primary treatment, under a stirring condition, alkali liquor is added into the to-be-treated cyanide containing wastewater to adjust a pH value of the to-be-treated cyanide containing wastewater to a preset alkaline range, and a sodium hypochlorite solution is added into the to-be-treated cyanide containing wastewater simultaneously to adjust an ORP of the to-be-treated cyanide containing wastewater to obtain a first mixture. The first mixture reacts and retains at room temperature for a period of time to thereby obtain the wastewater after cyanide primary treatment, and chlorine is remained in the wastewater after cyanide primary treatment.

In the embodiment, cyanide is oxidized to cyanide radical, the pH value of the wastewater is controlled to provide an alkaline environment for the wastewater, and the amount of the sodium hypochlorite ($NaOCl^-$) required for treating the wastewater is controlled simultaneously. The pH value is controlled in the preset alkaline range, thus the cyanide primary treatment can avoid or significantly reduce release of highly toxic cyanide (such as chlorocyanogen abbreviated as CNCl, and hydrogen cyanide abbreviated as HCN).

In step S2, a cyanide secondary treatment is performed on the wastewater after cyanide primary treatment to obtain wastewater after cyanide secondary treatment. In a process of the cyanide secondary treatment, chromium containing wastewater is added into the primary treated wastewater, an additive amount of the chromium containing wastewater is controlled, and acid liquor is added into the wastewater after cyanide primary treatment simultaneously to adjust a pH value of the wastewater after cyanide primary treatment to a preset acidity range to ensure a redox condition in the treatment tank suitable for performing the cyanide secondary treatment and obtain a second mixture. The second mixture reacts and retains at room temperature for a period of time, to thereby obtain the wastewater after cyanide secondary treatment, and chromium is remained in the wastewater after cyanide secondary treatment.

In the embodiment, the pH value is controlled to provide an acidity environment for the wastewater, and the ORP is controlled to provide the amount of hexavalent chromium required by the wastewater treatment. In the acidity environment, the hexavalent chromium has strong oxidizability, and oxidizes $CNO^-$ to $CO_2$ and $N_2$, and reduces $Cr_2O_7^{2-}$ to $Cr^{3+}$.

Furthermore, a part of the to-be-treated chromium containing wastewater is controlled to be added for the cyanide secondary treatment, and the remaining chromium containing wastewater is added into the next step, that is, the remaining chromium containing wastewater is merged with the wastewater after cyanide secondary treatment to perform a hexavalent chromium reduction treatment. Alternatively, all of the to-be-treated chromium containing wastewater is used for the cyanide secondary treatment, the wastewater after cyanide secondary treatment contains a significant amount of the hexavalent chromium, and is used for the hexavalent chromium reduction treatment.

In step S3, under a stirring condition, acid liquor is added into the wastewater after cyanide secondary treatment to adjust a pH value of the wastewater after cyanide secondary treatment to be acidic, and a sulfite solution is added into the wastewater after cyanide secondary treatment simultaneously to adjust an ORP of the wastewater after cyanide secondary treatment to be suitable for performing the hexavalent chromium reduction treatment, to thereby obtain a third mixture. The third mixture reacts at the room temperature for a period of time to reduce the hexavalent chromium to the trivalent chromium, and retains for a period of time, to thereby obtain wastewater after hexavalent chromium reduction treatment, and sulfite is remained in the wastewater after hexavalent chromium reduction treatment.

In the embodiment, a pH instrument can be used to monitor the pH value of the wastewater, and a proper amount of the acid liquor is added according to the monitoring result to keep the pH value in the preset range. An ORP instrument is used to monitor the ORP of the wastewater, and a proper amount of the sulfite solution is added according to the monitoring result to keep the ORP in the preset range, to thereby ensure the amount of sulfite required in the hexavalent chromium reduction treatment. When the hexavalent chromium reduction treatment reaches a preset effect, a concentration of the sulfite ($SO_3^{2-}$) remained in the wastewater after hexavalent chromium reduction treatment is in a range of 3 mg/L to 4 mg/L.

In step S4, neutralization flocculation, solid-liquid separation, and sand filtration are performed on the wastewater after hexavalent chromium reduction treatment sequentially to obtain dischargeable water meeting a preset standard.

Based on the steps S1-S4, firstly, in the cyanide primary treatment, the alkali liquor and the sodium hypochlorite solution are added into the to-be-treated cyanide containing wastewater, which can effectively adjust the pH value and the ORP of the to-be-treated cyanide containing wastewater, to thereby promote oxidation of the cyanides in the to-be-treated cyanide containing wastewater, and a proper amount of the chlorine is remained to ensure the oxidation reaction effect. Secondly, in the cyanide secondary treatment, the addictive amount of the chromium containing wastewater is controlled, the acid liquor is added, oxidizability of the hexavalent chromium in the acidic condition is used, and the cyanide secondary treatment is combined with the hexavalent chromium reduction treatment to oxidize CNO-generated by the cyanide primary treatment to $CO_2$ and $N_2$, and reduce $Cr_2O_7^{2-}$ to $Cr^{3+}$, so as to treat waste with waste. When performing the cyanide secondary treatment, other oxidants do not to be used to oxidize the cyanate radical, and an amount of reducing agent required for the next step of the hexavalent chromium reduction treatment is reduced. The pH value required in the next step hexavalent chromium reduction treatment is acidic, to thereby save the amount of the acid liquor used, and further reduce costs for treating the electroplating wastewater.

In an embodiment, in the cyanide primary treatment of the step S1, the alkali liquor is added based on a pH control system, the sodium hypochlorite solution is added based on an ORP control system, and the pH control system and the ORP control system are linked to control the pH value and the ORP of the to-be-treated cyanide containing wastewater in the preset range. The alkali liquor is a sodium hydroxide (NaOH) aqueous solution with a concentration of 5% to 10%, and the sodium hypochlorite solution is a NaOH aqueous solution with effective chlorine of 2.5% to 3%.

Figure 2:
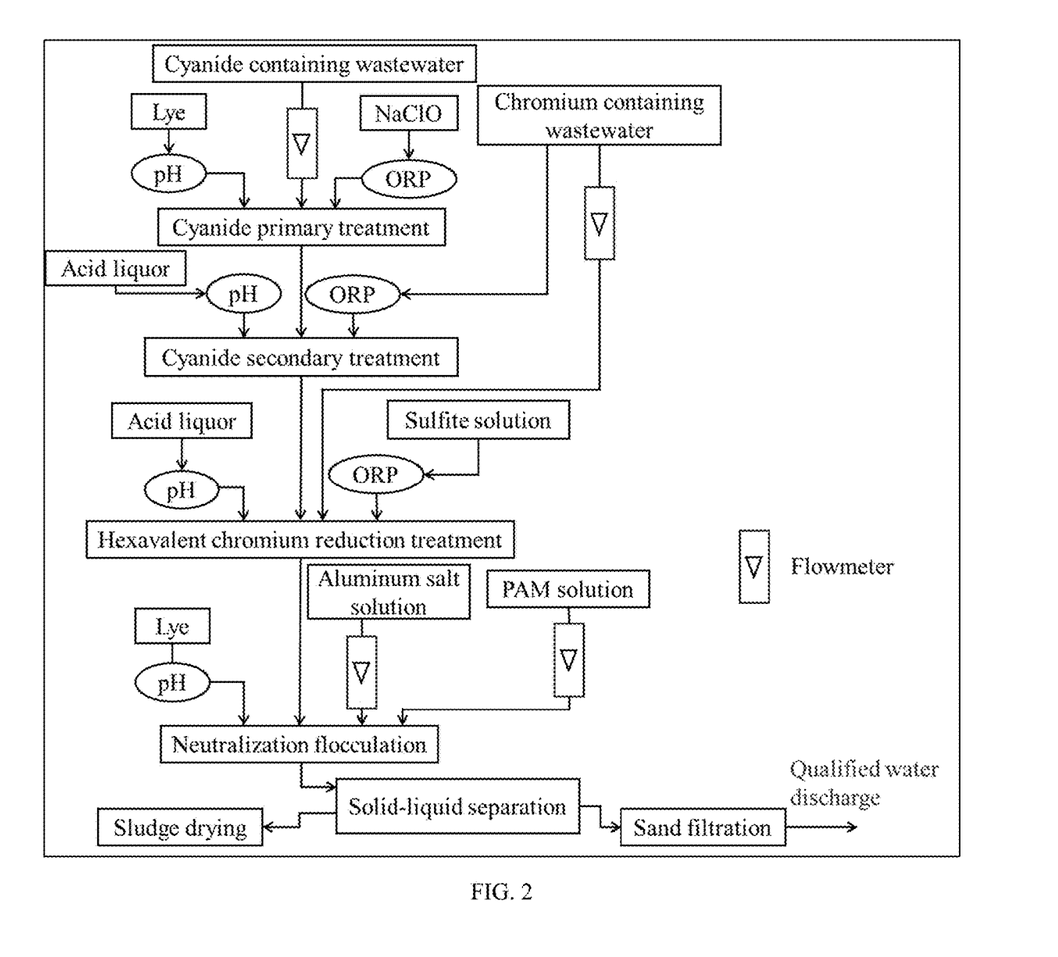
FIG. 2 illustrates a flowchart of the method for treating electroplating wastewater according to an embodiment of the disclosure.

Specifically, as shown in FIG. 2, the to-be-treated cyanide containing wastewater with a fixed flow rate is added into a cyanide primary treatment tank, and the pH control system and the ORP control system need to be used in the cyanide primary treatment to monitor the pH value and the ORP of the wastewater simultaneously. The pH control system and the ORP control system simultaneously and separately control addition of corresponding solutions, to ensure the pH value and the ORP in the preset range. According to requirements wastewater treatment and treatment processes, in a target range, a low pH control point is set as a control value of added alkali liquor based on the pH control system, and in a target range, a low ORP control point is set as a control value of added sodium hypochlorite solution based on the ORP control system. The pH control system is connected to a control valve, when the pH value of the wastewater is smaller than the low pH control point, the pH control system sends a signal to the control valve to add the alkali liquor into the wastewater. After reacting for a period of time, the pH value of the wastewater is raised to the low pH control point, the alkali liquor is stopped from being added, and the cyanide containing wastewater is continuously added. After reacting for a period of time, the pH value is lower than the low pH control point again, the pH control system controls to add the alkali liquor into the wastewater again to control the pH value of the wastewater within the target range. Meanwhile, the ORP control system is connected to the control valve, when the ORP value of the wastewater is smaller than the low ORP control point, the ORP control system sends a signal to the control valve to add the sodium hypochlorite solution into the wastewater. After reacting for a period of time, the ORP of the wastewater is raised to the low ORP control point, the sodium hypochlorite solution is stopped from being added, and the cyanide containing wastewater is continuously added. After reacting for a period of time, the ORP control system controls to add the sodium hypochlorite solution in to the wastewater again to control the ORP of the wastewater within the target range, to thereby ensure sufficient amount of NaClO that chlorine is remained after oxidizing cyanide in the wastewater to $CNO^-$. Through the control systems, stability of the redox condition is ensured during treatment, to thereby achieve a better treatment effect.

In an embodiment, parameters used in the process of the cyanide primary treatment include the follows: the preset alkaline range is 10-11. Within this range, the control of the pH value helps to provide suitable oxidation reaction environment conditions and promote the relative stability of cyanide to reduce the release amount of the cyanide.

The ORP of the to-be-treated cyanide containing wastewater is adjusted to a range of 300 mV to 350 mV. Within this range, it indicates that there is a sufficient amount of NaClO involved in the oxidation reaction of cyanide and can indicate whether the treatment has achieved the expected effect. The room temperature is in a range of 10° C. to 40° C., within this range, the control of the room temperature helps to ensure that the reaction process is performed at a suitable temperature.

A reaction period of the first mixture is in a range of 20 min to 25 min, the reaction time refers to a duration of the processing procedure. Within this range, the treatment reaction can be ensured to achieve the expected effect. A retention period of the first mixture is in a range of 10 min to 15 min, to further ensure the process effect.

In an embodiment, in the step S2, a process of controlling an additive amount of chromium containing wastewater, and adding acid liquor into the wastewater after cyanide primary treatment simultaneously to adjust a pH value of the wastewater after cyanide primary treatment to a preset acidity range to obtain a second mixture, to thereby ensure a redox condition in the treatment tank suitable for performing the cyanide secondary treatment includes the follows.

As shown in FIG. 2, the pH control system and the ORP control system are linked to control to add the acid liquor and the to-be-treated chromium containing wastewater into a cyanide secondary treatment tank respectively, to thereby adjust the pH value and the ORP of the wastewater within the preset range, and meet the acidic condition and the hexavalent chromium content required for oxidizing $CNO^-$ to $CO_2$ and $N_2$. The acid liquor is 5% to 6% hydrochloric acid solution or sulfuric acid solution.

In the embodiment, the control of the pH value helps to provide suitable oxidation reaction conditions, and ensure the hexavalent chromium having strong oxidizability. The ORP is an index for measuring the redox ability, and the ORP of the wastewater is monitored to determine changes of water quality. In this situation, the ORP control system can adjust the chromium containing wastewater added into the treatment tank in real-time according to the redox ability of the wastewater, to ensure that the concentration of the hexavalent chromium in the wastewater reaches the required level.

Specifically, as shown in FIG. 2, the pH control system and the ORP control system are used to monitor the pH value and the ORP of the wastewater simultaneously. According to requirements wastewater treatment and treatment processes, in a target range, a high pH control point is set as a control value of added acid liquor based on the pH control system, and in a target range, a low ORP control point is set as a control value of added chromium containing wastewater based on the ORP control system. The pH control system is connected to the control valve, the wastewater after cyanide primary treatment is added, when the pH value of the wastewater is greater than the high pH control point, the pH control system sends a signal to the control valve to add the acid liquor into the wastewater. After reacting for a period of time, the pH value of the wastewater is reduced to the high pH control point, the acid liquor is stopped from being added, and the wastewater after cyanide primary treatment is continuously added. After reacting for a period of time, the pH value of the wastewater is greater than the high pH control point again, the pH control system controls to add the acid liquor again to control the pH value of the wastewater within the target range. Meanwhile, the ORP control system is connected to the control valve, when the ORP of the wastewater is smaller than the low ORP control point, the ORP control system sends a signal to the control valve to add the chromium containing wastewater. After reacting for a period of time, the ORP of the wastewater is raised to the low ORP control point, the chromium containing wastewater is stopped from being added, and the wastewater after cyanide primary treatment is continuously added. After reacting for a period of time, the ORP of the wastewater is smaller than the low ORP control point again, the ORP control system controls to add the chromium containing wastewater again to control the ORP of the wastewater within the target range, to thereby ensure sufficient amount of the hexavalent chromium to oxidize $CNO^-$ to $CO_2$ and $N_2$.

In an embodiment, parameters used on the process of the cyanide secondary treatment include the follows: the preset acidity range is 2-3, the ORP of the wastewater after cyanide primary treatment is adjusted to a range of 550 mV to 600 mV, the room temperature is in a range of 10° C. to 40° C., a reaction period of the second mixture is in a range of 15 min to 20 min, and a retention period of the second mixture is in a range of 5 min to 8 min.

In the embodiment, an ORP instrument is used to monitor the ORP of the wastewater, and control input of the chromium containing wastewater according to the monitoring result. The ORP of the wastewater is remained at 550 mV to 600 mV to thereby achieve the input requirement of the chromium containing wastewater. The required amount of the hexavalent chromium for wastewater treatment and the presence of excess chromium are ensured.

Alternatively, the low ORP control point of the ORP control system is set as 550 mV, which can ensure that the addictive amount of the chromium containing wastewater for oxidizing $CNO^-$ in the cyanide secondary treatment meets the requirements and is excessive. The excessive chromium containing wastewater ensures better effect of the cyanide secondary treatment for the wastewater, so as to achieve a balance treatment of the cyanide containing wastewater and the chromium containing wastewater. Due to the fact that the chromium containing wastewater discharged from factory production is usually higher than the cyanide containing wastewater, this can achieve daily zero discharge of wastewater.

In an embodiment, an addiction method of the chromium containing wastewater is as follows.

A part of the chromium containing wastewater is added into a cyanide secondary treatment tank by the ORP control system, the remaining chromium containing wastewater is added into a hexavalent chromium reduction treatment tank to be merged with the wastewater after cyanide secondary treatment, to thereby perform the hexavalent chromium reduction treatment.

Specifically, as shown in FIG. 2, the ORP control system controls the required amount of the chromium containing wastewater to be added for the cyanide secondary treatment, a flow rate of the remaining chromium containing wastewater is controlled by a flowmeter for performing the hexavalent chromium reduction treatment.

In another embodiment, in the process of controlling an additive amount of chromium containing wastewater, and adding acid liquor into the wastewater after cyanide primary treatment simultaneously to adjust a pH value of the wastewater after cyanide primary treatment to a preset acidity range to obtain a second mixture, to thereby ensure a redox condition in the treatment tank suitable for performing the cyanide secondary treatment, an addiction method of the chromium containing wastewater is as follows.

All of the chromium containing wastewater at a preset flow rate is added by the ORP control system for the cyanide secondary treatment, and the hexavalent chromium reduction treatment is performed on the wastewater after cyanide secondary treatment.

Figure 3:
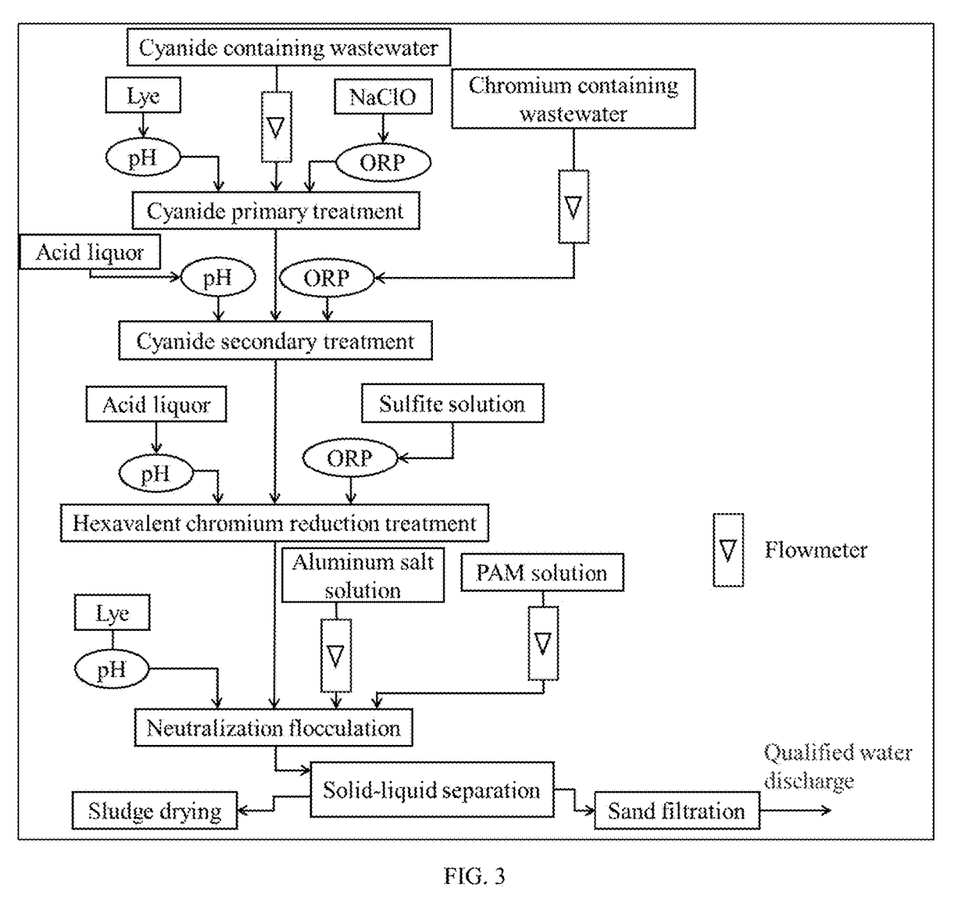
FIG. 3 illustrates a flowchart of the method for treating electroplating wastewater according to an embodiment of the disclosure.

Specifically, as shown in FIG. 3, all of the chromium containing wastewater at the preset flow rate is added by the ORP control system for the cyanide secondary treatment. After the reaction, there is still a large amount of the hexavalent chromium in the wastewater, which enters the hexavalent chromium reduction treatment stage.

In an embodiment, in the step S3, the ORP control system and the pH control system are linked to add the acid liquor and the sulfite solution respectively, to thereby ensure that the redox condition in the treatment tank is suitable for performing the cyanide secondary treatment.

In the embodiment, the sulfite solution is used as a reductant to reduce the hexavalent chromium to the trivalent chromium. The pH control system is used to control the addition of the acid liquor to adjust the pH value of wastewater in the preset acidity range. The ORP control system is used to monitor the ORP of the wastewater, and control to add the proper amount of the sulfite solution according to the monitoring result, to thereby adjust the ORP of wastewater to a preset range. Through this process, a required amount of the sulfite solution in wastewater can be reached, so as to ensure the treatment effect.

Specifically, as shown in FIG. 2 and FIG. 3, a pH control instrument and an ORP control instrument are installed to monitor the pH value and the ORP of the wastewater simultaneously. According to requirements wastewater treatment and treatment processes, in a target range, a high pH control point of the pH control instrument is set as a control value of added acid liquor, and in a target range, a high ORP control point of the ORP control instrument is set as a control value of added sulfite solution. The pH control instrument is connected to the control valve, when the pH value of the wastewater is greater than the high pH control point, the pH control instrument sends a signal to the control valve to add the acid liquor into the wastewater. After reacting for a period of time, the pH value of the wastewater is reduced to the high pH control point, the acid liquor is stopped from being added, and the wastewater after cyanide secondary treatment is continuously added. After reacting for a period of time, the pH control system controls to add the acid liquor again to control the pH value of the wastewater within the target range. Meanwhile, the ORP control instrument is connected to the control valve, when the ORP value of the wastewater is greater than the high ORP control point, the ORP control instrument sends a signal to the control valve to add the sulfite solution into the wastewater. After reacting for a period of time, the ORP of the wastewater is reduced to the high ORP control point, the sulfite solution is stopped from being added, and the wastewater after cyanide secondary treatment is continuously added. After reacting for a period of time, the ORP control system controls to add the sulfite solution again to control the ORP of the wastewater within the target range, to thereby ensure sufficient amount of the sulfite solution to reduce the hexavalent chromium in the wastewater to $Cr^{3+}$.

In an embodiment, parameters in a process for reducing the hexavalent chromium to the trivalent chromium are as follows: the pH value of the wastewater after cyanide secondary treatment is adjusted to a range of 2-3, the sulfite solution is a sodium sulfite solution or a sodium bisulfite solution with a concentration of 8% to 10%, the ORP of the wastewater after cyanide secondary treatment is adjusted to a range of 220 mV to 260 mV, a reaction period of the third mixture is in a range of 20 min to 25 min, and a retention period of the third mixture is in a range of 10 min to 15 min.

In an embodiment, the chlorine remained in the wastewater after cyanide primary treatment is quantified as $Cl^-$ with a concentration range of 3 mg/L to 5 mg/L. The chromium remained in the wastewater after cyanide secondary treatment is quantified as $Cr^{6+}$ with a concentration not less than 4 mg/L. The sulfite remained in the wastewater after hexavalent chromium reduction treatment is quantified as $SO_3^{2-}$ with a concentration range of 3 mg/L to 4 mg/L.

In an embodiment, the neutralization flocculation in the step 4 includes the following steps: alkali liquor is added into the wastewater after hexavalent chromium reduction treatment to adjust a pH value of the wastewater after hexavalent chromium reduction treatment to a preset alkaline range, and a flowmeter is used to control a fixed flow rate of an aluminum salt solution and a polyacrylamide (PAM) solution to be added into the wastewater after hexavalent chromium reduction treatment simultaneously to coagulate for a period of time, to thereby form metal hydroxide flocculent precipitation, and the metal hydroxide flocculent precipitation is retained for a period of time to obtain wastewater after neutralization flocculation.

In an embodiment, parameters in a process of the neutralization flocculation are as follows: the preset range of the pH value is 8-9, the aluminum salt solution is a polyaluminum chloride aqueous solution with a concentration of 4% to 5%, an addictive amount of the aluminum salt solution in the wastewater after hexavalent chromium reduction treatment is in a range of 6 $L/m^3$ to 8 $L/m^3$, a concentration of the PAM solution is 0.1% to 0.2%, an addictive amount of the PAM solution in the wastewater after hexavalent chromium reduction treatment is in a range of 6 $L/m^3$ to 7 $L/m^3$, a coagulation period is in a range of 10 min to 15 min, and a retention period of the metal hydroxide flocculent precipitation is in a range of 8 min to 10 min.

In an embodiment, a process of the solid-liquid separation in the step S4 includes the following steps: the solid-liquid separation is performed on the wastewater after neutralization flocculation to obtain a solid phase and a liquid phase. The solid phase is deposited at bottom, and periodically taken out for dehydration and drying.

Specifically, the wastewater after neutralization flocculation is added into a solid-liquid separation device, such as a slant plate (pipe) sedimentation device, a sedimentation tank and a settling discharge bed. The solid phase and the liquid phase can be effectively separated in these devices. In the solid-liquid separation device, the solid phase is deposited at a bottom of the solid-liquid separation device. The solid phase includes flocculants, suspended solids and other solid impurities, which have become relatively large particles after flocculation in wastewater and can be deposited to the bottom relatively easily. After a period of time, the solid phase will gradually accumulate at the bottom, and when it reaches a certain amount, the solid phase can be released from the solid-liquid separation device by opening a valve at the bottom of the solid-liquid separation device or by other means at regular intervals. This regular release process helps prevent excessive accumulation of the solid phase in the solid-liquid separation device, which can affect the separation efficiency and normal operation of the solid-liquid separation device. After the solid phase is released, dehydration and drying treatment are performed on the solid phase. The dehydration and drying treatment can be achieved through various methods, for example, a filter press, a centrifuge or a drying bed is used to perform the dehydration and drying treatment on the solid phase, to reduce a water content of the solid phase, which is beneficial for subsequent treatment and disposal.

A process of the sand filtration includes the following steps: the sand filtration is performed on the liquid phase. A device for the sand filtration is a sand filtration pool or a sand filtration tank.

Specifically, the liquid phase is added into the sand filtration device to be filtered through sand filtration mediums, to thereby remain solid particles and other impurities to obtain filtered water. When the filtered water reaches national environmental protection standard requirements, the filtered water is discharged or collected through an export, or reused after purification treatment.

A company located in Hubei Province, China and a company in Henan Province, China are taken as examples.

Electroplating types of the company located in Hubei Province include: cyanide copper plating, cyanide zinc plating, chromium plating, aluminum and aluminum alloy chromic acid anodizing, zinc plating passivation, and copper and copper alloy dichromate passivation. Specifically, cyanide copper plating wastewater and cyanide zinc plating wastewater are discharged to a cyanide containing wastewater pool. Chromium plating wastewater, aluminum and aluminum alloy chromic acid anodizing wastewater, zinc plating passivation wastewater, and copper and copper alloy dichromate passivation wastewater are discharged to a chromium containing wastewater pool.

Flow rates of the wastewater are as follows: the flow rate of the cyanide containing wastewater is 2.0 cubic meters per hour ($m^3/h$) to 2.5 $m^3/h$, and the flow rate of the chromium containing wastewater is 3.5 $m^3/h$ to 4.0 $m^3/h$.

Contents of the wastewater are as follows: total cyanide (quantified as $CN^-$) in the cyanide containing wastewater is 20 mg/L to 40 mg/L, and total chromium (quantified as Cr) in the chromium containing wastewater is 60 mg/L to 80 mg/L.

The electroplating wastewater treatment devices in the company are the device modified by the existing electroplating wastewater treatment device, and the environmental monitoring and acceptance shall comply with the water pollutant discharge limit specified in Table 2 of "People's Republic of China (PRC) National Standard GB21900-2008".

A flowchart of the embodiment is shown as FIG. 2.

(1) The treatment agents are prepared as follows: the alkali liquor is the NaOH solution with a concentration of 5% to 10%, the acid liquor is the hydrochloric acid solution or the sulfuric acid solution with a concentration of 5% to 6%, the oxidant solution is prepared by adding one volume of commercially available sodium hypochlorite solution containing 10% to 12% available chlorine and three volumes of water, the reducing agent solution is the sodium sulfite solution or the sodium bisulfite solution with a concentration of 8% to 10%, a concentration of the PAM solution is 0.1% to 0.2%, and the aluminum salt solution is a polyaluminum chloride (PAC) aqueous solution with a concentration of 4% to 5%.

(2) A mechanical anti-corrosion agitator is turned on, and a flowmeter is used to control the cyanide containing wastewater to be added into a cyanide primary treatment tank from the cyanide containing wastewater pool with a flow rate of 2.5 $m^3/h$. An automatic feeding system for alkali liquor and oxidant solution linked by a pH instrument and an ORP instrument is used to adjust a pH value of the cyanide containing wastewater to 10-11, and adjust an ORP of the cyanide containing wastewater to 300 mV to 350 mV. After oxidizing at the room temperature for 20 min to 25 min, with continuous flow for 10 min to 15 min, the cyanide in the wastewater is oxidized to $CNO^-$, and a concentration of residual chlorine (quantified as $Cl^-$) is 3 mg/L to 5 mg/L. The used devices are continuous and anticorrosive plastic material.

(3) The wastewater after cyanide primary treatment is added into a cyanide secondary treatment device, and the chromium containing wastewater is added under the stirring condition. An automatic feeding system for acid liquor and chromium containing wastewater linked by the pH instrument and the ORP instrument is used to adjust a pH value of the wastewater after cyanide primary treatment to 2-3, and adjust the ORP of the wastewater after cyanide primary treatment to 550 mV-600 mV. After reacting at the room temperature for 15 min-20 min, with continuous flow for 5 min-8 min, $Cr_2O_7^{2-}$ oxidizes $CNO^-$ to $CO_2$ and $N_2$, and $Cr_2O_7^{2-}$ is reduced to $Cr^{3+}$. The residual hexavalent chromium in the wastewater is quantified as $Cr^{6+}$ with a concentration of 4 mg/L-6 mg/L. The used devices are continuous and anticorrosive plastic material.

(4) The wastewater after cyanide secondary treatment is continuously added into a hexavalent chromium reduction treatment device, and the flowmeter is used to control the remaining chromium containing wastewater to be added into the hexavalent chromium reduction treatment device with a preset amount. Under the stirring condition, an automatic feeding system for the acid liquor and the reducing agent sodium bisulfite solution linked by the pH instrument and the ORP instrument is used to adjust a pH value of the wastewater after cyanide secondary treatment to 2-3, and adjust the ORP of the wastewater after cyanide secondary treatment to 220 mV-260 mV. After reacting at the room temperature for 20 min-25 min, with continuous flow for 10 min-15 min, the hexavalent chromium is reduced to the trivalent chromium. A specific chemical equation of the hexavalent chromium reduction treatment is as follows:

$$Cr_2O_7^{2-}+3HSO_3^-+5H^-\rightarrow 2Cr^{3+}+3SO_4^{2-}+4H_2O$$

The residual sulfites in the wastewater are quantified as $SO_3^{2-}$ with a concentration of 3 mg/L-4 mg/L.

The used devices are continuous and anticorrosive plastic material.

(5) The wastewater after hexavalent chromium reduction treatment is added into a neutralization flocculation device. Under the stirring condition, the pH control instrument is used to automatically add the alkali liquor into the neutralization flocculation device to adjust a pH value of the wastewater after hexavalent chromium reduction treatment to 8-9. Based on 1.0 $m^3$ of wastewater, the flowmeter is used to control to add 6 liters (L)-8 L of the aluminum salt solution and 6 L-7 L of PAM solution. After reacting for 10 min-15 min, with continuous flow for 8 min-10 min. Harmful metal ions such as copper, chromium, and zinc, as well as other suspended solids in the wastewater generate precipitates and form easily settling flocs.

(6) The wastewater after neutralization flocculation is added into the solid-liquid separation device to separate the solid phase and the liquid phase of the wastewater after neutralization flocculation, and the solid phase is deposited at the bottom. Every 3-4 working days, sludge from a sedimentation device is discharged into a sludge pool and pumped into a plate and frame filter press for dehydration and drying. The filtered water is returned to the chromium containing wastewater pool, and the dried sludge is sent to a qualified solid waste treatment company.

(7) The liquid phase of the wastewater after neutralization flocculation is added into the sand filtration pool to for sand filtration, and the discharged water after sand filtration is inspected and accepted by the local environmental protection department in Hubei Province. The monitoring result report and acceptance standards are shown in the table below.

| Monitoring item | Monitoring point | | GB21900-2008 table 2 Emission limits for water pollutants (unit: mg/L) |
|---|---|---|---|
| | Workshop exhaust outlet (unit: mg/L) | | |
| | First | Second | |
| pH | 8.01 | 8.12 | 6-9 |
| Total chromium | 0.062 | 0.078 | 1.0 |
| Hexavalent chromium | 0.044 | 0.044 | 0.2 |
| Total cyanide (quantified as $CN^-$) | 0.023 | 0.024 | 0.3 |
| Total copper | 0.013 | 0.014 | 0.5 |
| Total zinc | Not detected | Not detected | 1.5 |
| Total nickel | Not detected | Not detected | 0.5 |
| Chemical oxygen demand ($COD_{Cr}$) | <50 | <50 | 80 |

Electroplating types of the company located in Henan Province include: cyanide zinc plating, cyanide copper plating, chromium plating, zinc plating passivation, copper and copper alloy dichromate passivation and aluminum and aluminum alloy electropolishing. Specifically, cyanide zinc plating wastewater and cyanide copper plating wastewater are discharged to a cyanide containing wastewater pool. Chromium plating wastewater, zinc plating passivation wastewater, copper and copper alloy dichromate passivation wastewater and aluminum and aluminum alloy electropolishing wastewater are discharged to a chromium containing wastewater pool.

Flow rates of the wastewater are as follows: the flow rate of the cyanide containing wastewater is 1.5 $m^3$/h-2.0 $m^3$/h, and the flow rate of the chromium containing wastewater is 3.0 $m^3$/h-3.5 $m^3$/h.

Contents of the wastewater are as follows: total cyanide (quantified as $CN^-$) in the cyanide containing wastewater is 5 mg/L-40 mg/L, total chromium (quantified as Cr) in the chromium containing wastewater is 50 mg/L-60 mg/L, total zinc is 30 mg/L-40 mg/L, and total copper is 20 mg/L-30 mg/L.

The company is a newly established company, Environmental monitoring and acceptance of the electroplating wastewater treatment devices of the company shall comply with the water pollutant discharge limit specified in Table 2 of "People's Republic of China (PRC) National Standard GB21900-2008".

A flowchart of the embodiment is shown in FIG. 3.

(1) The treatment agents are prepared as follows: the alkali liquor is the NaOH solution with a concentration of 5%-10%, the acid liquor is the hydrochloric acid solution or the sulfuric acid solution with a concentration of 5%-6%, the oxidant solution is prepared by adding one volume of commercially available sodium hypochlorite solution containing 10%-12% available chlorine and three volumes of water, the reducing agent solution is the sodium sulfite solution or the sodium bisulfite solution with a concentration of 8%-10%, a concentration of the PAM solution is 0.1%-0.2%, and the aluminum salt solution is a polyaluminum chloride aqueous solution with a concentration of 4%-5%.

(2) A mechanical anti-corrosion agitator is turned on, and a flowmeter is used to control the cyanide containing wastewater to be added into a cyanide primary treatment tank from the cyanide containing wastewater pool with a flow rate of 2.0 $m^3$/h. An automatic feeding system for alkali liquor and oxidant solution linked by a pH instrument and an ORP instrument is used to adjust a pH value of the cyanide containing wastewater to 10-11, and adjust an ORP of the cyanide containing wastewater to 300 mV-350 mV. After oxidizing at room temperature for 20 min-25 min, with continuous flow for 10 min-15 min, the cyanide in the wastewater is oxidized to $CNO^-$, and a concentration of residual chlorine (quantified as Cl–) is 3 mg/L-5 mg/L. The used devices are continuous and anticorrosive plastic material.

(3) The wastewater after cyanide primary treatment is added into a cyanide secondary treatment tank. Under the stirring condition, the pH control system is used to add the acid liquor to adjust a pH value of the wastewater after cyanide primary treatment to 2-3. Meanwhile, the flowmeter is used to control the flow rate of the added chromium containing wastewater to be 3.5 $m^3$/h, to adjust the ORP of the wastewater after cyanide primary treatment to be greater than or equal to 550 mV, to thereby meet the input requirement of the chromium containing wastewater. After reacting at the room temperature for 15 min-20 min, with continuous flow for 5 min-8 min, $CNO^-$ is oxidized to $CO_2$ and $N_2$, and the hexavalent chromium is reduced to the trivalent chromium. There is a significant amount of hexavalent chromium remaining in the wastewater. The used devices are continuous and anticorrosive plastic material.

(4) The wastewater after cyanide secondary treatment is added into a hexavalent chromium reduction treatment tank. Under the stirring condition, an automatic feeding system for the acid liquor and the reducing agent sodium bisulfite solution linked by the pH instrument and the ORP instrument is used to adjust a pH value of the wastewater after cyanide secondary treatment to 2-3, and adjust the ORP of the wastewater after cyanide secondary treatment to 220 mV-260 mV. After reacting at the room temperature for 20-25 min, with continuous flow for 10-15 min, the hexavalent chromium is reduced to $Cr^{3+}$. The residual sulfites in the wastewater are quantified as $SO_3^{2-}$ with a concentration of 3 mg/L-4 mg/L after reacting. The used devices are continuous and anticorrosive plastic material, (5) The wastewater after hexavalent chromium reduction treatment is added into a neutralization flocculation device. Under the stirring condition, the pH control instrument is used to add the alkali liquor into the neutralization flocculation device to adjust a pH value of the wastewater after hexavalent chromium reduction treatment to 8-9. Based on 1.0 $m^3$ of wastewater, the flowmeter is used to control to add 6 L-8 L of aluminum salt solution and 6 L-7 L of PAM solution. After reacting for 10 min-15 min, with continuous flow for 8 min-10 min. Metal ions such as copper, zinc, and chromium, as well as other suspended solids in the wastewater generate precipitates and form easily settling flocs.

(6) The wastewater after neutralization flocculation is added into the solid-liquid separation device to separate the solid phase and the liquid phase of the wastewater after neutralization flocculation, and the solid phase is deposited at the bottom. Every 3-4 working days, sludge from a sedimentation device is discharged into a sludge pool and pumped into a plate and frame filter press for dehydration and drying. The filtered water is returned to the chromium containing wastewater pool, and the dried sludge is sent to a qualified solid waste treatment company.

(7) The liquid phase of the wastewater after neutralization flocculation is added into the sand filtration pool to for sand filtration, and the discharged water after sand filtration is inspected and accepted by the local environmental protection department in Henan Province. The monitoring result report and acceptance standards are shown in the table below.

|  | Monitoring point | | |
| --- | --- | --- | --- |
|  | Workshop exhaust outlet (unit: mg/L) | | GB21900-2008 table 2 Emission limits for water pollutants (unit: |
| Monitoring item | First | Second | mg/L) |
| pH | 8.01 | 8.12 | 6-9 |
| Total chromium | 0.012 | 0.011 | 1.0 |
| Hexavalent chromium | 0.006 | 0.006 | 0.2 |
| Total lead | 0.0043 | 0.0034 | 0.2 |
| Total nickel | Not detected | Not detected | 0.5 |
| Total cyanide (quantified as CN⁻) | 0.023 | 0.024 | 0.3 |
| Total copper | 0.08 | 0.08 | 0.5 |
| Total zinc | 0.142 | 0.133 | 1.5 |
| Total aluminum | 0.111 | 0.118 | 3.0 |
| Chemical oxygen demand ($COD_{Cr}$) | 26.51 | 27.34 | 80 |

In summary, the technical solutions of the disclosure has been described in conjunction with the drawings. However, it is easy for those skilled in the art to understand that the scope of protection of the disclosure is not limited to these specific embodiments. Without departing from the principles of the disclosure, those skilled in the art may make equivalent amendments or substitutions to the original technical features, and the technical solutions resulting from these amendments or substitutions will fall within the scope of protection of the disclosure.

What is claimed is:

1. A method for treating electroplating wastewater, comprising:
    adding to-be-treated cyanide containing wastewater into a cyanide primary treatment tank, and performing a cyanide primary treatment on the to-be-treated cyanide containing wastewater in the cyanide primary treatment tank to obtain primary treated wastewater; wherein a process of the cyanide primary treatment comprises: under a stirring condition, adding alkali liquor into the to-be-treated cyanide containing wastewater to adjust a power of hydrogen (pH) value of the to-be-treated cyanide containing wastewater to a first preset alkaline range, and adding a sodium hypochlorite solution into the to-be-treated cyanide containing wastewater simultaneously to adjust an oxidation-reduction potential (ORP) of the to-be-treated cyanide containing wastewater to obtain a first mixture; and allowing the first mixture to react at room temperature for a period of time and retain for a period of time, to thereby obtain the primary treated wastewater; and the primary treated wastewater comprises a remaining amount of chlorine;
    performing a cyanide secondary treatment on the primary treated wastewater to obtain secondary treated wastewater; wherein a process of the cyanide secondary treatment comprises: adding chromium containing wastewater into the primary treated wastewater, controlling an additive amount of the chromium containing wastewater and adding acid liquor into the primary treated wastewater simultaneously to adjust a pH value of the primary treated wastewater to a first preset acidity range to obtain a second mixture; and allowing the second mixture to react at room temperature for a period of time and retain for a period of time, to thereby obtain the secondary treated wastewater; and the secondary treated wastewater comprises a remaining amount of chromium;
    performing a hexavalent chromium reduction treatment on the secondary treated wastewater to obtain reduction treated wastewater; wherein a process of the hexavalent chromium reduction treatment comprises: under a stirring condition, adding acid liquor into the secondary treated wastewater to adjust a pH value of the secondary treated wastewater to a second preset acidity range, and adding a sulfite solution into the secondary treated wastewater simultaneously to adjust an ORP of the secondary treated wastewater to be suitable for performing the hexavalent chromium reduction treatment, to thereby obtain a third mixture; and allowing the third mixture to react at room temperature for a period of time to reduce hexavalent chromium to trivalent chromium and retain for a period of time, to thereby obtain the reduction treated wastewater; and the reduction treated wastewater comprises a remaining amount of sulfite; and
    performing neutralization flocculation, solid-liquid separation, and sand filtration on the reduction treated wastewater sequentially to obtain dischargeable water meeting a preset standard.

2. The method as claimed in claim 1, wherein in the process of the cyanide primary treatment, the alkali liquor is added based on a pH control system, the sodium hypochlorite solution is added based on an ORP control system, and the pH control system and the ORP control system are linked to control the pH value and the ORP of the to-be-treated cyanide containing wastewater.

3. The method as claimed in claim 2, wherein in the process of the cyanide primary treatment, the first preset alkaline range is 10-11, the ORP of the to-be-treated cyanide containing wastewater is adjusted to a range of 300 millivolts (mV) to 350 mV, the room temperature is in a range of 10 Celsius degree (° C.) to 40° C., the period of time of the first mixture to react is in a range of 20 minutes (min) to 25 min, and the period of time of the first mixture to retain is in a range of 10 min to 15 min.

4. The method as claimed in claim 1, wherein the controlling an additive amount of the chromium containing wastewater and adding acid liquor into the primary treated wastewater simultaneously to adjust a pH value of the primary treated wastewater to a first preset acidity range, comprises:
    controlling the additive amount of the chromium containing wastewater added into the primary treated wastewater based on an ORP control system, and adding the acid liquor into the primary treated wastewater simultaneously based on a pH control system; wherein the ORP control system and the pH control system are linked to control an ORP and the pH value of the primary treated wastewater.

5. The method as claimed in claim 1, wherein an addition method of the chromium containing wastewater into the primary treated wastewater comprises:

adding the primary treated wastewater into a cyanide secondary treatment tank, and adding the chromium containing wastewater into the cyanide secondary treatment tank at a preset flow rate by an ORP control system for the cyanide secondary treatment to thereby obtain the secondary treated wastewater.

6. The method as claimed in claim 5, wherein in the process of the cyanide secondary treatment, the first preset acidity range is 2-3, an ORP of the primary treated wastewater is adjusted to a range of 550 mV to 600 mV, the room temperature is in a range of 10° C. to 40° C., the period of time of the second mixture to react is in a range of 15 min to 20 min, and the period of time of the second mixture to retain is in a range of 5 min to 8 min;

wherein in the process of the hexavalent chromium reduction treatment, the second preset acidity range is 2-3, the ORP of the secondary treated wastewater is adjusted to a range of 220 mV to 260 m V, the room temperature is in a range of 10° C. to 40° C., the period of time of the third mixture to react is in a range of 20 min to 25 min, and the period of time of the third mixture to retain is in a range of 10 min to 15 min.

7. The method as claimed in claim 1, wherein the remaining amount of chlorine in the primary treated wastewater is quantified as chloride ($Cl^-$) with a concentration range of 3 milligrams per liter (mg/L) to 5 mg/L;

the remaining amount of chromium in the secondary treated wastewater is quantified as hexavalent chromium ($Cr^{6+}$) with a concentration not less than 4 mg/L; and the remaining amount of sulfite in the reduction treated wastewater is quantified as sulfite ($SO_3^{2-}$) with a concentration range of 3 mg/L to 4 mg/L.

8. The method as claimed in claim 1, wherein the neutralization flocculation comprises: adding alkali liquor into the reduction treated wastewater by a pH control system to adjust a pH value of the reduction treated wastewater to a second preset alkaline range, and adding an aluminum salt solution and a polyacrylamide solution into the reduction treated wastewater simultaneously to coagulate for a period of time, to thereby form metal hydroxide flocculent precipitation, and retaining the metal hydroxide flocculent precipitation for a period of time to obtain neutralization flocculated wastewater.

9. The method as claimed in claim 8, wherein in a process of the neutralization flocculation, the second preset alkaline range is 8-9, the aluminum salt solution is a polyaluminum chloride aqueous solution with a concentration of 4% to 5%, an additive amount of the aluminum salt solution in the reduction treated wastewater is in a range of 6 liters per cubic meter ($L/m^3$) to 8 $L/m^3$, the polyacrylamide solution is an aqueous solution with a concentration of 0.1% to 0.2%, an additive amount of the polyacrylamide solution in the reduction treated wastewater is in a range of 6 $L/m^3$ to 7 $L/m^3$, the period of time to coagulate is in a range of 10 min to 15 min, and the period of time of the metal hydroxide flocculent precipitation to retain is in a range of 8 min to 10 min.

* * * * *